(12) United States Patent
Syversen

(10) Patent No.: US 9,151,394 B2
(45) Date of Patent: Oct. 6, 2015

(54) VALVE SYSTEM WITH A SEALING MEMBER

(75) Inventor: Per Risvik Syversen, Fredrikstad (NO)

(73) Assignee: Kongsberg Multipurpose Valves AS, Kongsberg (NO)

( * ) Notice: Subject to any disclaimer, the term of this patent is extended or adjusted under 35 U.S.C. 154(b) by 185 days.

(21) Appl. No.: 13/983,837

(22) PCT Filed: Feb. 9, 2012

(86) PCT No.: PCT/EP2012/052174
§ 371 (c)(1), (2), (4) Date: Aug. 6, 2013

(87) PCT Pub. No.: WO2012/107511
PCT Pub. Date: Aug. 16, 2012

(65) Prior Publication Data
US 2013/0306175 A1 Nov. 21, 2013

(30) Foreign Application Priority Data
Feb. 11, 2011 (DK) .................................. 2011 00090

(51) Int. Cl.
*F16K 3/02* (2006.01)
*F16K 3/18* (2006.01)
(Continued)

(52) U.S. Cl.
CPC ............... *F16K 3/029* (2013.01); *F16K 3/0254* (2013.01); *F16K 3/0272* (2013.01); *F16K 3/182* (2013.01);
(Continued)

(58) Field of Classification Search
CPC ............. F16K 1/44; F16K 3/16; F16K 3/029; F16K 3/0254; F16K 3/0272; F16K 3/182; F16K 31/44; F16K 43/00; Y10T 37/88062; Y10T 317/87981

USPC .......................... 251/167, 194–204, 326–329
See application file for complete search history.

(56) References Cited

U.S. PATENT DOCUMENTS 2,496,451 A * 2/1950 Eichenberg ................... 137/338
3,557,822 A 1/1971 Chronister
(Continued)

FOREIGN PATENT DOCUMENTS

CN 201141453 Y 10/2008
DE 655493 12/1937
(Continued)

OTHER PUBLICATIONS

International Search Report for Serial No. PCT/EP2012/052174 dated Apr. 13, 2012.
(Continued)

*Primary Examiner* — Marina Tietjen
(74) *Attorney, Agent, or Firm* — McCormick, Paulding & Huber LLP

(57) ABSTRACT

A valve system and a fluid flow system with a valve system are disclosed. The valve system comprises a valve housing defining a fluid inlet for receiving a fluid medium, and a fluid outlet for delivering a fluid medium; at least one valve element arranged in an interior part of the valve housing, the valve element(s) being movable relative to the valve housing, the position of the valve element(s) relative to the valve housing determining a flow rate of fluid medium through the valve system from the fluid inlet towards the fluid outlet; a moving mechanism arranged to cause movements of the valve element(s); and a sealing member arranged in an interior part of the valve housing, the sealing member being capable of separating the interior of the valve housing into a first part comprising the fluid inlet and the fluid outlet, and a second part.

16 Claims, 12 Drawing Sheets

(51) Int. Cl.
*F16K 43/00* (2006.01)
*F16K 31/44* (2006.01)

(52) U.S. Cl.
CPC ............ *F16K 31/44* (2013.01); *F16K 43/00* (2013.01); *Y10T 137/87981* (2015.04); *Y10T 137/88062* (2015.04)

(56) References Cited

U.S. PATENT DOCUMENTS 4,146,209 A * 3/1979 Leva .............. 251/168
6,672,565 B2 * 1/2004 Russell .............. 251/297

FOREIGN PATENT DOCUMENTS

| GB | 818 798 | 8/1959 |
| JP | 2000046206 A | 2/2000 |
| RU | 2324096 C1 | 5/2008 |
| SU | 23943 | 11/1931 |

OTHER PUBLICATIONS

Danish Search Report Serial No. PA201100090 dated Sep. 23, 2011.

* cited by examiner

VALVE SYSTEM WITH A SEALING MEMBER

CROSS REFERENCE TO RELATED APPLICATIONS

This application is entitled to the benefit of and incorporates by reference essential subject matter disclosed in International Patent Application No. PCT/EP2012/052174 filed on Feb. 9, 2012 and Danish Patent Application No. PA 2011 00090 filed Feb. 11, 2011.

FIELD OF THE INVENTION

The present invention relates to a valve system, in particular a double disk valve system, which allows inspection and/or maintenance of one or more valve parts of the valve system without interrupting a fluid flow through the valve system, and/or without removing the valve part(s) from the valve system.

BACKGROUND OF THE INVENTION

In some flow systems, such as flow systems arranged under ground or offshore, it is difficult and undesirable to stop fluid flow or dismantle valve parts in order to perform inspection and/or maintenance on various valve parts of valve systems arranged in the flow system. On the other hand, it is crucial that valve systems arranged in such flow systems operate correctly and reliably, and therefore regular inspections and maintenance operations are necessary.

GB 818,798 discloses a gate valve comprising a valve member being movable by an actuating member in a direction parallel to its valve seating. The valve member is connected to the actuating member by parallel links and co-operating with stationary guides, whereby during the initial part of the opening movement and the final part of the closing movement of the actuating member, the valve member will be moved away from or towards the valve seating as the case may be, the parallel links being adapted to maintain the valve member parallel with the seating. The valve housing may be provided with a transverse slot so as to enable a damper plate to be inserted therein to seal the bore of the valve body and prevent fluid passing through the valve from escaping through the upper end of the valve body. This allows the valve elements to be removed from the valve system for inspection and/or maintenance purposes without requiring that the fluid flow through the valve is interrupted. However, the damper plate must be specially and manually introduced in the transverse slot, thereby requiring an additional step in order to provide the required sealing of the valve body. Furthermore, it is necessary to remove the valve elements from the valve system in order to perform the inspection and/or maintenance.

SUMMARY

It is an object of embodiments of the invention to provide a valve system which allows inspection and/or maintenance of valve part(s), in particular valve element(s), without interrupting a fluid flow through the valve system, and/or without removing the valve part(s) from the valve system.

It is a further object of the invention to provide a valve system which automatically allows inspection and/or maintenance of valve part(s), in particular valve element(s), when the valve system is moved to an open position.

According to a first aspect the invention provides a valve system comprising:

- a valve housing defining a fluid inlet for receiving a fluid medium, and a fluid outlet for delivering a fluid medium,
- at least two valve elements arranged in an interior part of the valve housing, the valve elements being movable relative to the valve housing, the position of the valve elements relative to the valve housing determining a flow rate of fluid medium through the valve system from the fluid inlet towards the fluid outlet,
- a moving mechanism arranged to cause movements of the valve elements, and
- a sealing member arranged in an interior part of the valve housing, the sealing member being capable of separating the interior of the valve housing into a first part comprising the fluid inlet and the fluid outlet, and a second part, wherein the sealing member is mounted on the moving mechanism, the sealing member thereby being movable along with the valve elements.

In the present context the term 'valve system' should be interpreted to mean a system which is capable of controlling a fluid flow through the system. In particular, a valve system is often capable of selectively allowing or preventing a fluid flow through the system.

The valve system comprises a valve housing defining a fluid inlet and a fluid outlet. In the present context the term 'housing' should be interpreted to mean a substantially closed enclosure defining an interior part of the valve system. The fluid inlet is adapted to be fluidly connected to a fluid supply, thereby receiving fluid medium and allowing the fluid medium to enter the interior part of the valve housing. Similarly, the fluid outlet is adapted to be fluidly connected to a fluid drain, thereby delivering fluid medium from the interior part of the valve housing. Accordingly, fluid medium passing through the valve system enters through the fluid inlet, passes through the interior part of the valve housing and exits through the fluid outlet.

At least one valve element is arranged in an interior part of the valve housing. The valve element(s) is/are movable relative to the valve housing, and the position of the valve element(s) determines a flow rate of fluid medium through the valve system. The valve element(s) may preferably be movable to a position in which a flow of fluid medium from the fluid inlet to the fluid outlet is prevented. Furthermore, the valve element(s) are preferably movable between several positions defining various opening degree of the valve system, i.e. varying the fluid flow through the valve system.

A moving mechanism is arranged to cause movements of the valve element(s). Thus, operation of the moving mechanism results in movements of the valve element(s), and thereby in changes in the flow rate of fluid medium through the valve system.

A sealing member is arranged in an interior part of the valve housing. The sealing member is capable of separating the interior of the valve housing into a first part comprising the fluid inlet and the fluid outlet, and a second part, in a sealing manner, i.e. in such a manner that the fluid medium flowing through the valve system is substantially prevented from passing between the first part and the second part of the interior of the valve housing. Accordingly, the sealing member can be arranged in a position in which the first part, and thereby the fluid inlet and the fluid outlet, is separated from the second part of the interior of the valve housing in a sealing manner. When the sealing member is arranged in this position it is possible to gain access to the second part of the interior of the valve housing without interrupting or disturbing a flow of fluid medium through the valve system from the fluid inlet to the fluid outlet. Thereby inspection of valve parts arranged in the second part of the interior of the valve housing can be inspected while the valve system continues to operate, i.e. while fluid medium is allowed to flow through the valve system from the fluid inlet to the fluid outlet.

The sealing member is mounted on the moving mechanism. Thereby the sealing member is movable along with the valve element(s). Accordingly, it is ensured that a given position of the valve element(s) always corresponds to a well defined position of the sealing member. Accordingly, there is always a position of the valve element(s) which corresponds to the sealing member being in the position where it separates the first part of the interior of the valve housing from the second part of the interior of the valve housing. Furthermore, it is ensured that the sealing member is automatically moved into the separating position when the valve element(s) is/are moved into the position corresponding to the separating position. Thereby a separate part and/or a separate action is not required in order to allow inspection of maintenance of valve parts arranged in the second part of the interior of the valve housing.

The valve system may comprise at least two valve elements, each valve element being movable by means of the moving mechanism in a substantially synchronous manner. In the case that the valve system comprises exactly two valve elements, the valve system is a so-called double valve system. In this case, one of the valve elements may be arranged to control the flow of fluid medium through the fluid inlet, while the other valve element may be arranged to control the flow of fluid medium through the fluid outlet. Moving the valve elements in a substantially synchronous manner ensures that the flow of fluid medium through the fluid inlet and the flow of fluid medium through the fluid outlet are controlled substantially synchronously. It should, however, be noted that, according to some embodiments of the present invention, two or more valve elements may be moved individually by means of the moving mechanism, i.e. in a manner which is not substantially synchronous.

Each valve element may be in the form of a disk, each disk being movable into sealing contact with a valve seat, thereby preventing a fluid flow through the valve system from the fluid inlet towards the fluid outlet. According to this embodiment, the valve element(s) can be moved to a closed position, i.e. a position in which fluid medium is not allowed to flow through the valve system.

The sealing member may have an outer shape which matches an interior cross section of the valve housing. This allows for sealing contact between the sealing member and the walls of the valve housing. Thereby the sealing member may form a movable boundary between a first part of the interior of the valve housing and a second part of the interior of the valve housing, the boundary being movable along with the moving mechanism.

Thus, the sealing member may comprise a rim portion adapted to form a sealing contact with a wall part of the valve housing. According to this embodiment, the sealing member ensures that fluid medium is not allowed to pass between the first part of the interior of the valve housing and the second part of the interior of the valve housing, regardless of the position of the sealing member.

The sealing member may be automatically moved to a separating position in which the interior of the valve housing is separated into the first part and the second part, when the moving mechanism moves the valve element(s) towards a position allowing an increased fluid flow through the valve system from the fluid inlet towards the fluid outlet. According to this embodiment, the first part, and thereby the fluid inlet and the fluid outlet, is separated from the second part by means of the sealing member when the valve is in a fully open position. In this position, the valve element(s) may advantageously be moved away from the fluid inlet and the fluid outlet in order to allow maximum flow rate through the valve system. For instance, the valve element(s) may be moved into the second part of the interior of the valve housing. In this case it is possible to inspect and/or perform maintenance on the valve element(s) when the valve system is in the fully open position, without interrupting the flow of fluid medium through the valve system and without dissembling the valve system. Thereby it can easily be ensured that the valve element(s) is/are capable of providing fluid tight closure of the valve when the valve element(s) is/are moved to the closed position.

The sealing member may be or comprises a plate member, the plate member forming a wall part of the first part of the interior of the valve housing when the sealing member is in a separating position in which the interior of the valve housing is separated into the first part and the second part.

The valve element(s) may be arranged in the second part of the interior of the valve housing when the sealing member is in a separating position in which the interior of the valve housing is separated into the first part and the second part. As described above, this allows inspection and/or maintenance to be performed on the valve element(s) when the sealing member is in the separating position.

The sealing member may be or comprises two plate members, a first plate member and a second plate member, forming double wall parts of the first part of the interior of the valve housing when the sealing member is in a separating position. This secure a double sealing, when the system is being inspected and/or maintained The two plate members may be forming an intermediate room in the interior of the valve housing when the sealing member is in a separating position, and an opening may be placed in the valve housing and forming an opening in the intermediate room, a valve member may be placed in connection with the opening for bleeding of the valve system.

The moving mechanism may be mechanically operated. Thus, the moving mechanism may comprise a spindle and a nut adapted to cause a substantially linear movement of the valve element(s) and the sealing member. According to this embodiment, the moving mechanism is operated by means of a rotational movement. Due to the spindle and the nut, the rotational movement is converted into a substantially linear movement of the valve element(s) and the sealing member. This allows the valve element(s) and the sealing member to be moved in a very accurate manner.

As an alternative, the valve element(s) and the sealing member may be moved in any other suitable manner, as long as movements of the valve element(s) causes the flow rate of fluid medium through the valve system to change. Thus, the moving mechanism may, e.g., be hydraulically or electrically operated. e.g., be hydraulically operated by hydraulic oil trapped between the two valve elements.

The moving mechanism may comprise one or more articulated links interconnecting each of the valve element(s) to the moving mechanism, thereby allowing movement of each valve element towards and away from the moving mechanism. The movements of the valve element(s) towards and away from the moving mechanism may, e.g., cause each valve element to be moved away from and towards a valve seat. The valve element(s) may, in addition, be arranged to be moved along with the moving mechanism.

The moving mechanism may be arranged to cause movements of the valve element(s) along a first direction, and along a second direction being substantially transverse to the first direction. According to this embodiment, the valve element(s) may be moved along with the moving mechanism when being moved along the first direction, and the valve element(s) may be moved towards or away from the moving mechanism when being moved along the second direction. In this case the movement along the second direction may advantageously be caused by one or more articulated links. Alternatively or additionally, the valve element(s) may be moved along curved tracks causing a combined movement along the first direction and the second direction.

Movements along the second direction may, e.g., be automatically initiated when the moving mechanism, along with the valve element(s) and the sealing member, has been moved to a predefined position. This may, e.g., be obtained by allowing each valve element to be moved along a curved track as described above. As an alternative, it may be obtained by allowing a part of the moving mechanism to abut a part of the valve housing when the moving mechanism reaches the predefined position. The abutment may, e.g., prevent further movement of the valve element(s) along the first direction. In this case the valve element(s) is/are only moved along one of the first and second directions at any given time during operation of the moving mechanism. This may, e.g., be obtained by allowing a part of the moving mechanism to abut a surface arranged substantially perpendicularly to the first direction. As an alternative, the abutment may merely cause the valve element(s) to be pushed along the second direction while movement along the first direction is continued. This may, e.g., be obtained by allowing a part of the moving mechanism to abut a surface which is inclined relative to the first direction.

The valve housing may provide access to the second part of the interior of the valve housing. As described above, this allows inspection and/or maintenance of valve parts arranged in the second part of the interior of the valve housing when the sealing member is in the separating position, without interrupting the flow of fluid medium through the valve system.

The valve system may further comprise a locking mechanism adapted to lock the valve element(s) in a position defining a minimal flow rate of fluid medium through the valve system. The position defining a minimal flow rate of fluid medium through the valve system may, e.g., be a closed position the valve system, i.e. a position in which a fluid flow through the valve system is substantially prevented. The locking mechanism may advantageously operate in such a manner that a locking is automatically provided when the moving mechanism moves the valve element(s) to the minimal flow rate position. This may, e.g., be provided by providing two mating surfaces which are moved into abutment during such a movement, the abutment of the two mating surfaces preventing further movements of the valve element(s).

The locking of the valve element(s) in the minimal flow position allows access to be gained to the interior of the valve housing when the valve element(s) is/are in this position, without risking that the valve element(s) is/are accidentally moved away from this position. This allows safe inspection, maintenance and/or replacement of valve parts arranged in the first part of the valve housing, as well as of the sealing member. Thus, according to this embodiment, it is possible to inspect every part of the valve system, either by arranging the valve element(s) in the minimal flow position and locking it/them there, or by arranging the sealing member in the separating position.

According to a second aspect the invention provides a fluid flow system comprising a valve system according to the first aspect of the invention.

It should be noted that a person skilled in the art would readily recognise that any feature described in combination with the first aspect of the invention could also be combined with the second aspect of the invention, and vice versa.

Since the fluid flow system according to the second aspect of the invention comprises a valve system according to the first aspect of the invention, the remarks set forth above with reference to the first aspect of the invention are equally applicable here.

The fluid flow system may be or form part of an offshore installation, such as a fluid flow system for use in connection with an oil rig. In offshore installations it is often very difficult to dissemble valve systems, and it is often undesirable to interrupt the fluid flow. On the other hand, it is very important to be able to inspect and/or perform maintenance on fluid flow systems of offshore installations in order to ensure that they operate properly. It is therefore advantageous to use the fluid flow system according to the second aspect of the invention in an offshore installation, because it provides the possibility of inspecting and performing maintenance on valve parts without interrupting the fluid flow in the fluid flow system, and without dissembling the fluid flow system or the valve system of the fluid flow system.

As an alternative, the fluid flow system may be or form part of an underground installation. In this case the remarks set forth above with respect to the offshore installation are also applicable. As another alternative, the fluid flow system may be or form part of any other suitable kind of installation.

BRIEF DESCRIPTION OF THE DRAWINGS

The invention will now be described in further detail with reference to the accompanying drawings in which.

DETAILED DESCRIPTION

Figure 1:
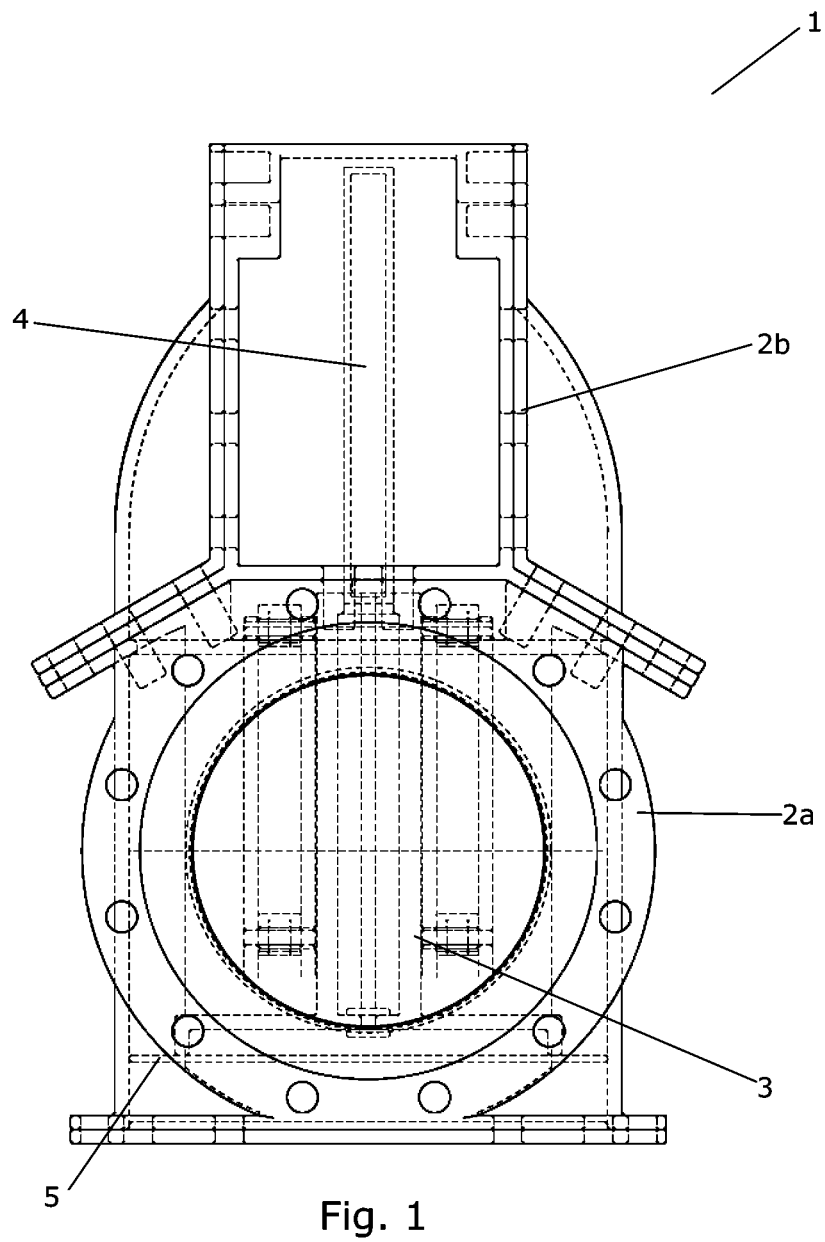
FIG. 1 is a side view of a valve system according to an embodiment of the invention.

FIG. 1 is a side view of a valve system 1 according to an embodiment of the invention. The valve system 1 comprises a valve housing 2 defining a first part, in the form of a lower valve housing 2a, and a second part, in the form of an upper valve housing 2b. The lower valve housing 2a is provided with a fluid inlet 3 and a fluid outlet (not visible in FIG. 1). When the valve system 1 is arranged in a fluid flow system, and the valve system 1 is in an open state, fluid medium is allowed to flow through the valve system 1 from the fluid inlet 3 to the fluid outlet via the lower valve housing 2a.

A moving mechanism 4 is arranged in the interior part of the valve housing 2. The moving mechanism 4 is adapted to cause movements of two valve elements (not visible in FIG. 1) in the form of circular plates in the interior part of the valve housing 2. The movements of the valve elements include a substantially vertical movements in which the valve elements are moved between the lower valve housing 2a and the upper valve housing 2b, as well as a substantially horizontal movement in which the valve elements are moved away from the moving mechanism 4 and towards the fluid inlet 3 or the fluid outlet, or towards the moving mechanism 4 and away from the fluid inlet 3 or the fluid outlet. When the valve elements are moved in a direction away from the moving mechanism 4 and towards the fluid inlet 3 or the fluid outlet, they are moved into contact with valve seats arranged at the fluid inlet 3 and the fluid outlet, respectively, thereby causing the valve system 1 to be moved into a closed state. Similarly, when the valve elements are moved in a direction towards the moving mechanism 4 and away from the fluid inlet 3 or the fluid outlet, the valve system 1 is moved into an open state, and the opening degree of the valve system 1 is increased. The movements of the moving mechanism 4 and the valve elements will be described in further detail below with reference to FIGS. 7-12.

A sealing member 5 in the form of a plate is mounted on a lower part of the moving mechanism 4. Thus, when the moving mechanism 4 is operated to move the valve elements between the lower valve housing 2a and the upper valve housing 2b, the sealing member 5 is moved along. The sealing member 5 is movable between a first extreme position in the lower valve housing 2a and a second extreme position where the sealing member 5 separates the lower valve housing 2a from the upper valve housing 2b in a sealing manner. When the sealing member 5 is in the second extreme position, it is thereby possible to gain access to the upper valve housing 2b without interrupting the flow of fluid medium through the valve system 1, the fluid medium flowing in the lower valve housing 2a. In FIG. 1 the sealing member 5 is arranged in the first extreme position.

It is an advantage that the sealing member 5 is mounted on the moving mechanism 4, and that it is thereby movable along with the valve elements, because it is thereby ensured that the sealing member 5 is automatically moved into the second extreme position when the valve elements are moved into the upper valve housing 2b. Thereby it is possible to inspect and/or perform maintenance on the valve elements when they are in this position, without interrupting the flow of fluid medium through the valve system 1.

Figure 2:
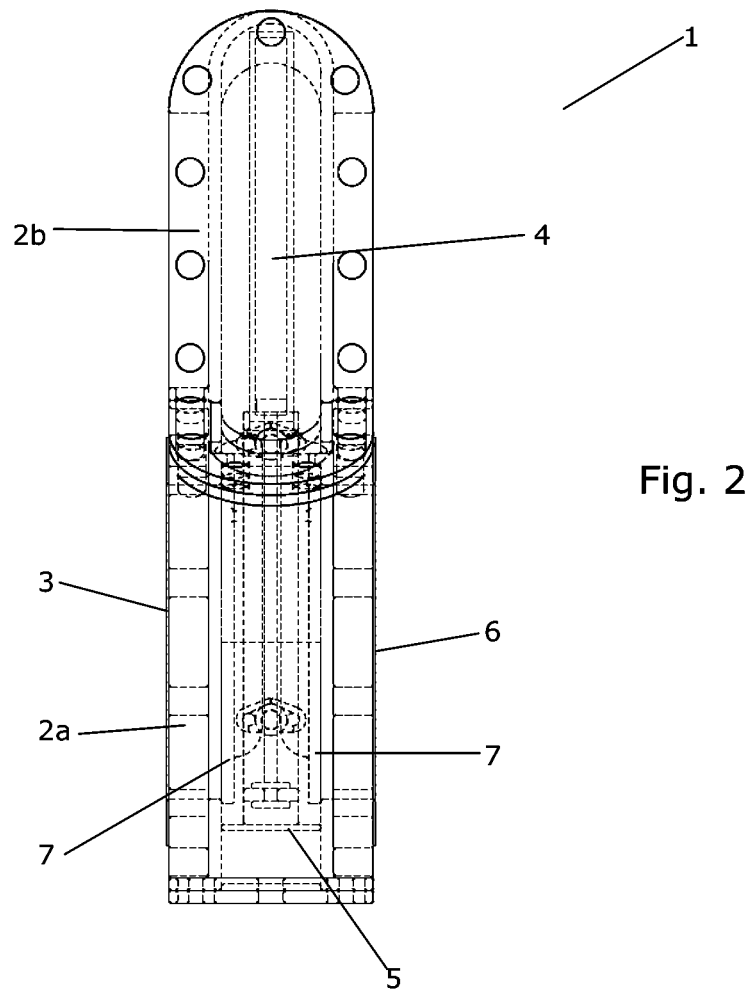
FIG. 2 is a front view of the valve system of FIG. 1.

FIG. 2 is a front view of the valve system 1 of FIG. 1. In FIG. 2 the position of the fluid outlet 6 is indicated. Furthermore, it can be seen that the valve elements 7 are arranged in the interior part of the lower valve housing 2a. The valve elements 7 are arranged on opposite sides of the moving mechanism 4. One of the valve elements 7 is arranged next to the fluid inlet 3, and the other valve element 7 is arranged next to the fluid outlet 6. By moving the valve elements 7 from the position shown in FIG. 2 towards the fluid inlet 3 and the fluid outlet 6, respectively, the valve elements 7 are moved into contact with valve seats (not visible in FIG. 2), thereby preventing a flow of fluid medium through the fluid inlet 3 and the fluid outlet 6, respectively, i.e. the valve system 1 is moved into a closed state. This will be described in further detail below with reference to FIGS. 7-12.

Figure 3:
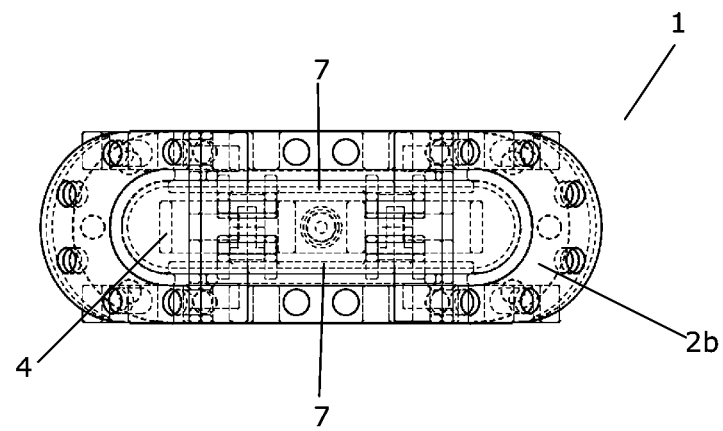
FIG. 3 is a top view of the valve system of FIG. 1.

FIG. 3 is a top view of the valve system 1 of FIG. 1.

Figure 4:
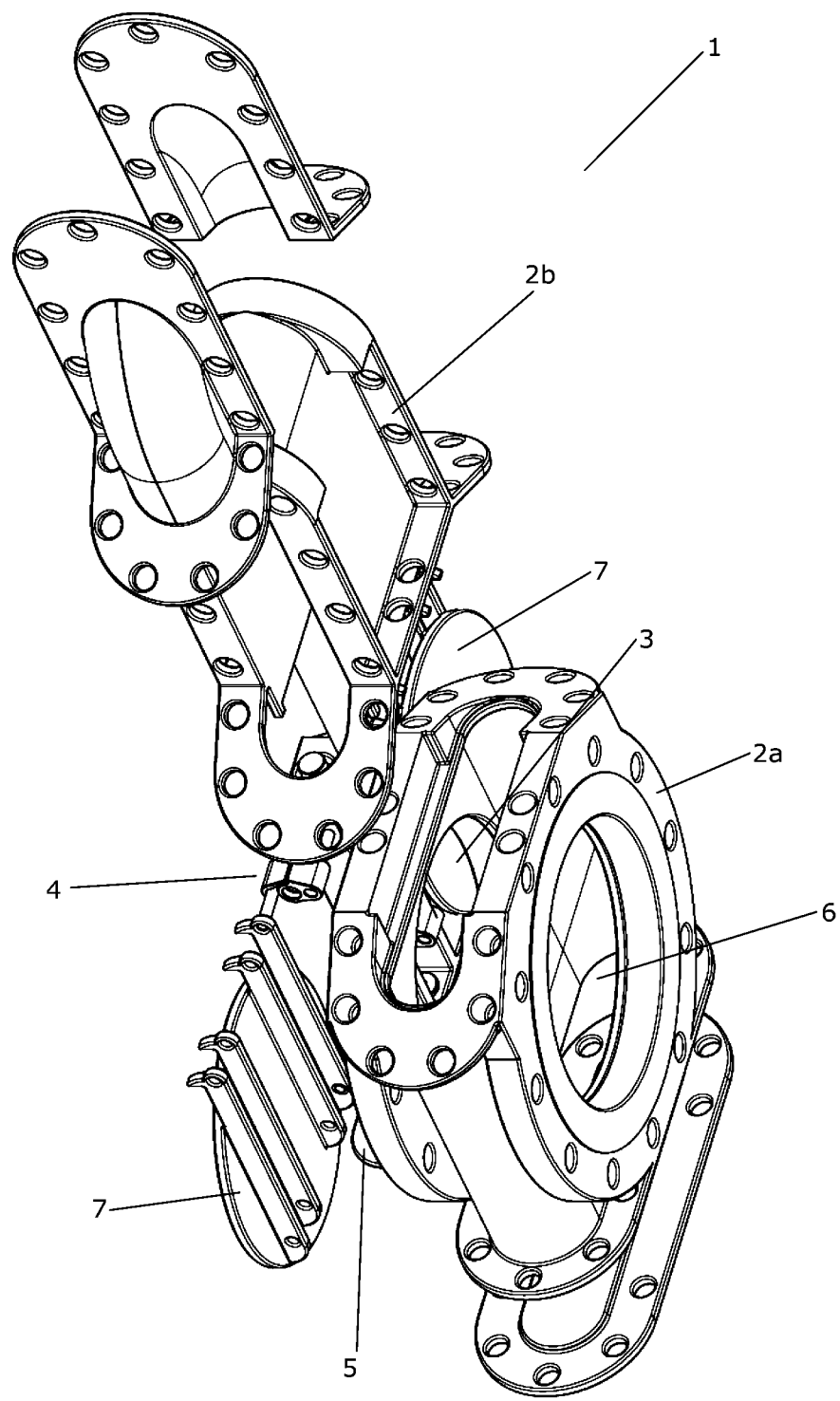
FIG. 4 is an exploded view of the valve system of FIG. 1.

FIG. 4 is an exploded view of the valve system 1 of FIG. 1. It is clear from FIG. 4 that the upper valve housing 2b can be separated from the lower valve housing 2a. This allows the upper valve housing 2b as well as valve parts arranged in the upper valve housing 2b to be easily inspected or replaced when the sealing member 5 is in the separating position.

Figure 5:
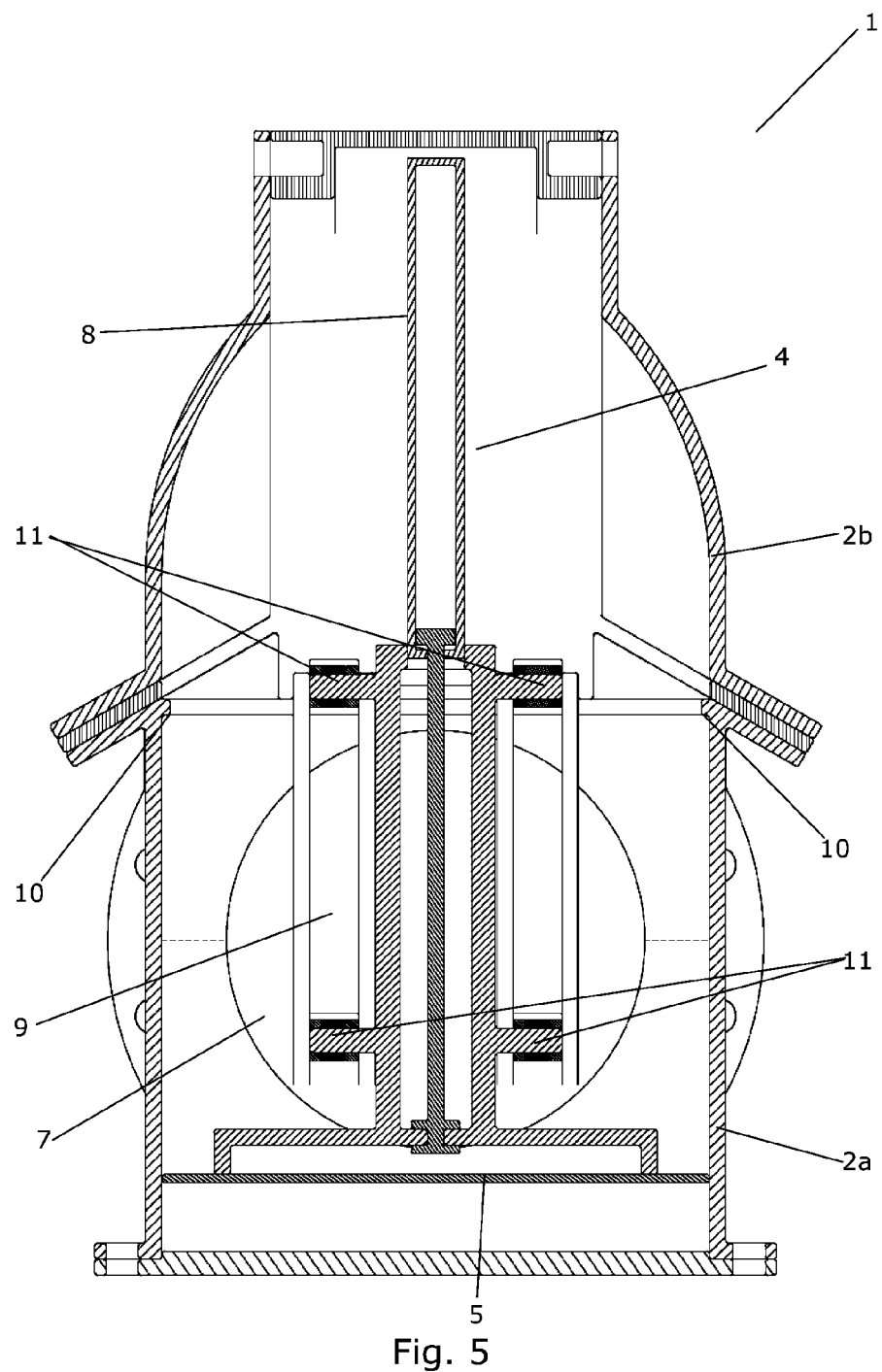
FIG. 5 is a cross sectional view of the valve system of FIG. 1 along a first direction.

FIG. 5 is a cross sectional view of the valve system 1 of FIG. 1. FIG. 5 shows details of the moving mechanism 4. The moving mechanism 4 comprises an upper part 8 arranged substantially fixed in the position shown in FIG. 5 in the interior part of the upper valve housing 2b. The moving mechanism 4 further comprises a lower part 9 arranged movably relative to the upper part 8. In FIG. 5 the lower part 9 is arranged in the interior part of the lower valve housing 2a.

When the moving mechanism 4 is operated, the lower part 9 is moved relative to the upper part 8 in a direction towards the upper valve housing 2b. The valve elements 7 and the sealing member 5 are moved along. Thereby the valve elements 7 are moved into the interior part of the upper valve housing 2b, and the sealing member 5 is moved into abutment with edge 10. When the sealing member 5 is arranged in this position, it separates the lower valve housing 2a from the upper valve housing 2b in a sealing manner. The moving mechanism 4 can also be operated to move the lower part 9 of the moving mechanism 4 in a reverse direction, i.e. towards the lower valve housing 2a.

It is clear from FIG. 5 that the sealing member 5 has a size and a shape which matches the cross sectional size and shape of the lower valve housing 2a.

The moving mechanism 4 is further provided with moving arms 11 which are capable of moving the valve elements 7 along a direction towards and away from the moving mechanism 4 as described above.

Figure 6:
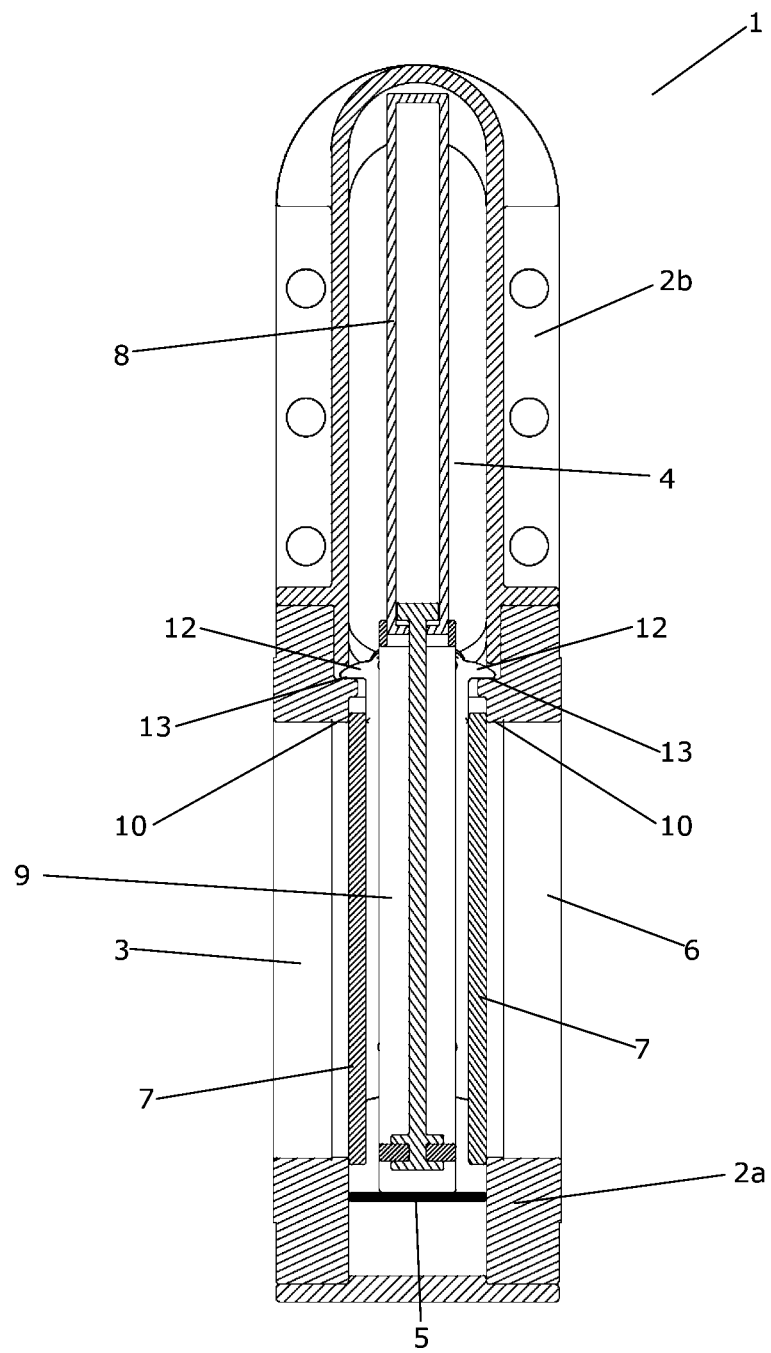
FIG. 6 is a cross sectional view of the valve system of FIG. 1 along a second direction being substantially perpendicular to the cross section shown in FIG. 5, and FIGS. 7-12 illustrate movements of the moving mechanism of the valve system of FIG. 1.

FIG. 6 is also a cross sectional view of the valve system 1 of FIG. 1. The cross section of FIG. 6 is substantially perpendicular to the cross section of FIG. 5. In FIG. 6 it can be seen that the valve elements 7 are provided with protruding parts 12 adapted to abut against wall parts 13 of the valve housing 2 when the valve elements 7 are moved from the upper valve housing 2b towards the lower valve housing 2a. When the protruding parts 12 have been moved into abutment with the wall parts 13, further downwards movement of the valve elements 7 is prevented. Continued operation of the moving mechanism 4, moving the lower part 9 of the moving mechanism 4 further downwards into the lower valve housing 2a, causes the moving arms (not visible in FIG. 6) to move the valve elements 7 away from the lower part 9 of the moving mechanism 4 and towards the fluid inlet 3 and the fluid outlet 6, respectively, thereby closing the valve system 1. This will be described in further detail below with reference to FIGS. 7-12. In FIG. 6 the valve elements 7 are arranged in abutment with valve seats formed at the fluid inlet 3 and the fluid outlet 6, respectively, i.e. the valve system 1 is in a closed state.

FIGS. 7-12 illustrate movements of the moving mechanism 4 of the valve system 1 of FIG. 1. In FIGS. 7-12 the valve system 1 is shown in a perspective and cross sectional view.

Figure 7:
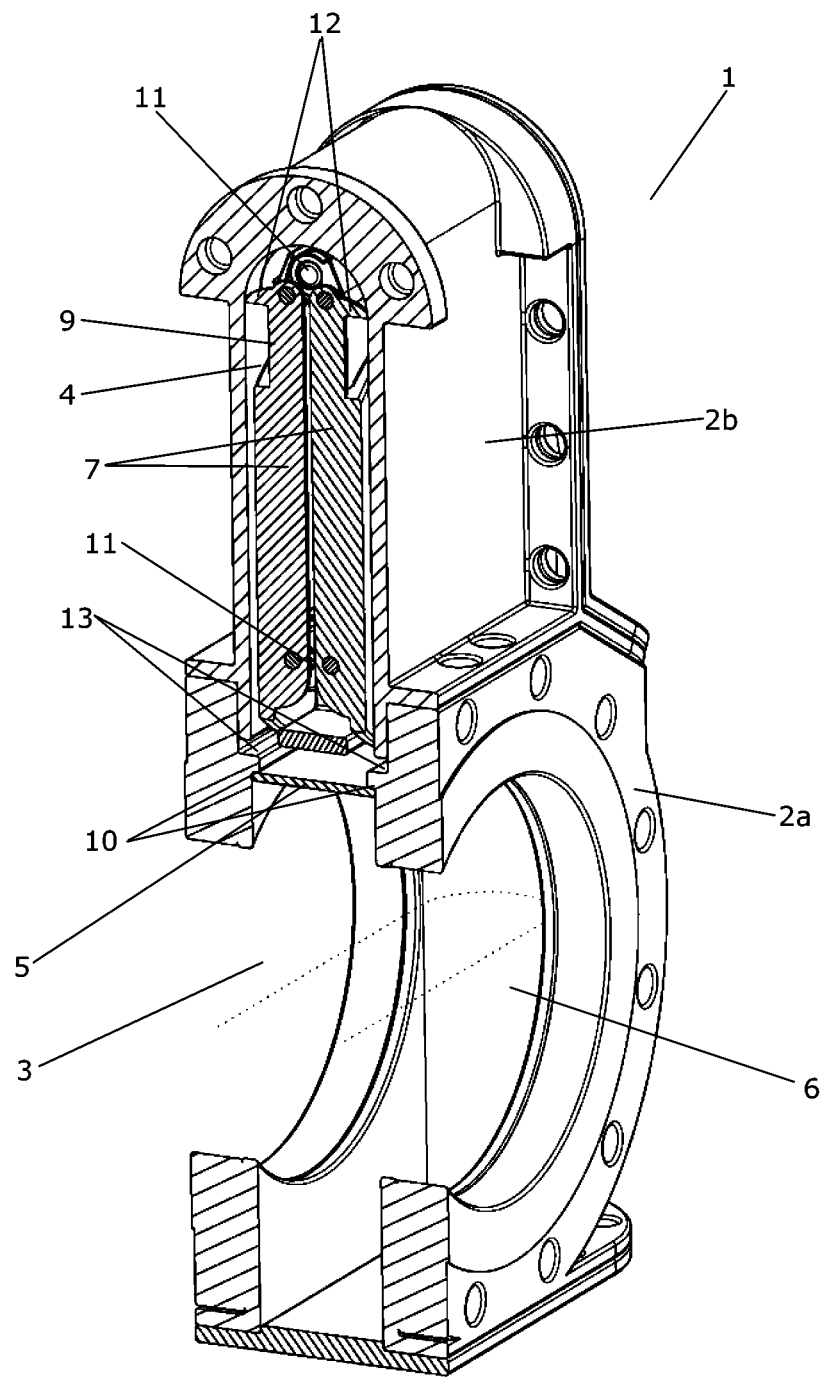

In FIG. 7 the lower part 9 of the moving mechanism 4 is positioned in such a manner that the sealing member 5 is arranged in the second extreme position, i.e. the sealing member 5 is arranged in abutment with the edge 10, thereby separating the lower valve housing 2a from the upper valve housing 2b in a sealing manner. The valve elements 7 are arranged completely in the upper valve housing 2b, and the valve system 1 is in a fully open state, allowing maximum flow rate through the valve system 1 from the fluid inlet 3 to the fluid outlet 6.

Since the valve elements 7 are arranged in the interior part of the upper valve housing 2b, and the upper valve housing 2b is separated from the lower valve housing 2a by means of the sealing member 5, it is possible to inspect and/or perform maintenance on the valve elements 7 when they are in the position shown in FIG. 7.

Figure 8:
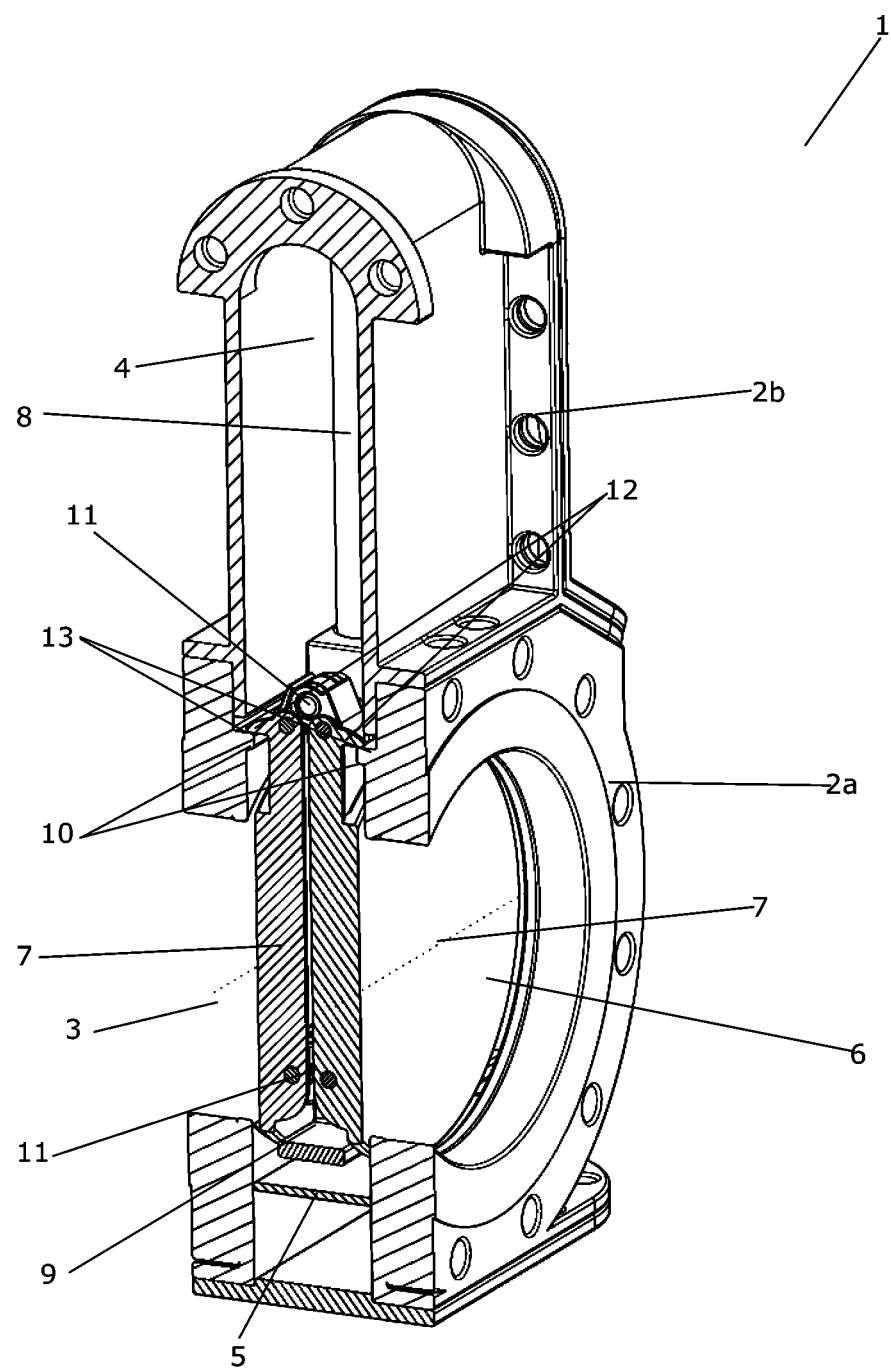

In FIG. 8 the lower part 9 of the moving mechanism 4 has been moved in a downwards direction relative to the upper part 8 of the moving mechanism 4. Thus, the valve elements 7 and the sealing member 5 have been moved into the interior part of the lower valve housing 2a, and the protruding parts 12 have been moved into abutment with the wall parts 13. The movement of the valve elements 7 towards the fluid inlet 3 and the fluid outlet 6, respectively, has not yet been commenced. Accordingly, the valve elements 7 are arranged adjacent to the fluid inlet 3 and the fluid outlet 6, respectively, but are not in contact with the valve seats. Accordingly, the valve system 1 is not in a closed state, but the flow rate of fluid medium through the valve system 1 is significantly lower than the flow rate in the situation illustrated in FIG. 7.

During movement of the lower part 9 of the moving mechanism 4 from the position shown in FIG. 7 to the position shown in FIG. 8, the valve elements 7 are kept close to the lower part 9 of the moving mechanism 4 because the protruding parts 12 abut the side walls of the upper valve housing 2*b*. Thereby it is ensured that the valve elements 7 are not accidentally moved in a horizontal direction during the vertical movement, and the closing movement of the valve system 1 can thereby be controlled in an accurate manner.

Figure 9:
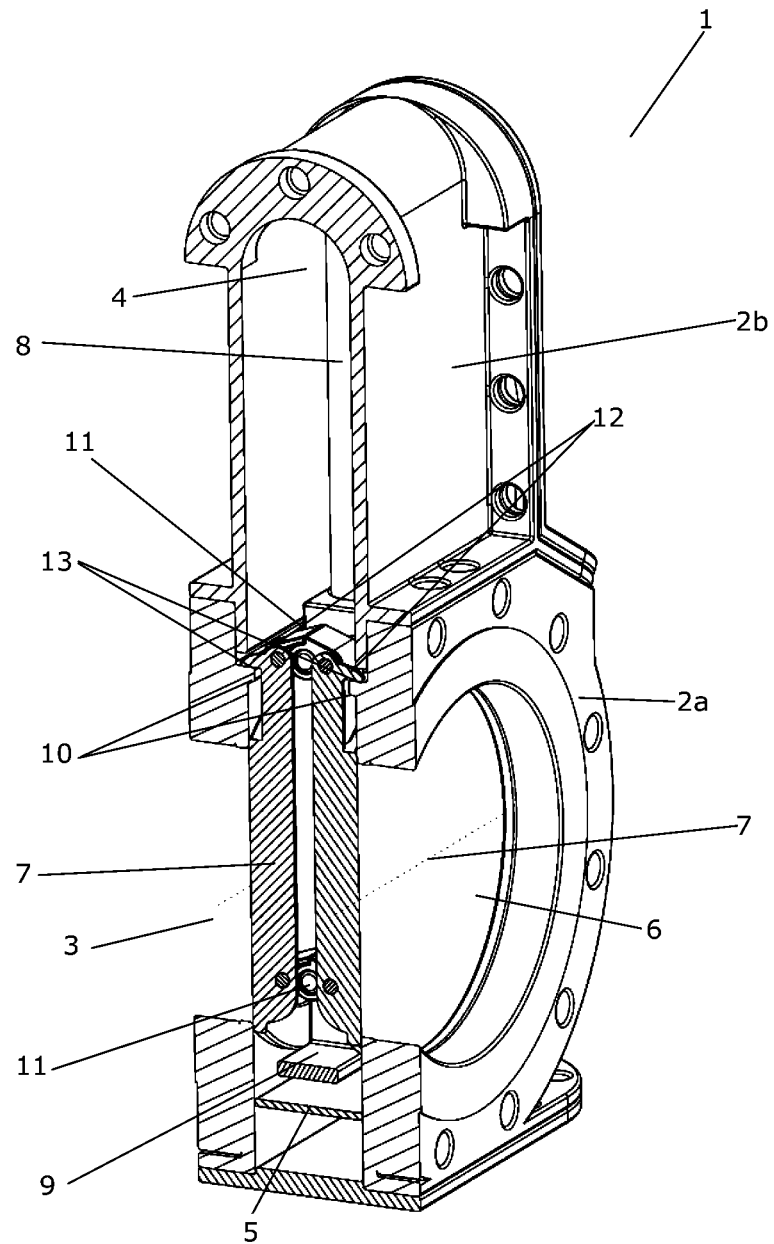

In FIG. 9 the lower part 9 of the moving mechanism 4 has been moved further downwards relative to the upper part 8 of the moving mechanism 4. Since the protruding parts 12 are arranged in abutment with the wall parts 13, the valve elements 7 are prevented from moving further downwards. Instead the further downwards movement of the lower part 9 of the moving mechanism 4 has caused the moving arms 11 to move the valve elements 7 in a direction towards the fluid inlet 3 and the fluid outlet 6, respectively, and into abutment with the valve seats. Accordingly, in FIG. 9 the valve system 1 is in a fully closed state, i.e. a flow of fluid medium through the valve system 1 is prevented. Furthermore, the valve elements 7 are locked in this position because two surfaces of the moving arms 11 abut each other, thereby preventing further outward movement of the valve elements 7. All forces acting on the moving arms 11 push them towards the moving mechanism 4. The locking of the valve elements 7 prevents them from being accidentally moved away from the closed state, i.e. the valve elements 7 are kept in a position where they prevent a flow of fluid medium through the valve system 1. Accordingly, it is safe to remove the bottom of the valve housing 2, thereby making it possible to inspect, perform maintenance on or replace any valve part arranged in the lower valve housing 2*a*, including the valve elements 7 and the sealing member 5.

Figure 10:
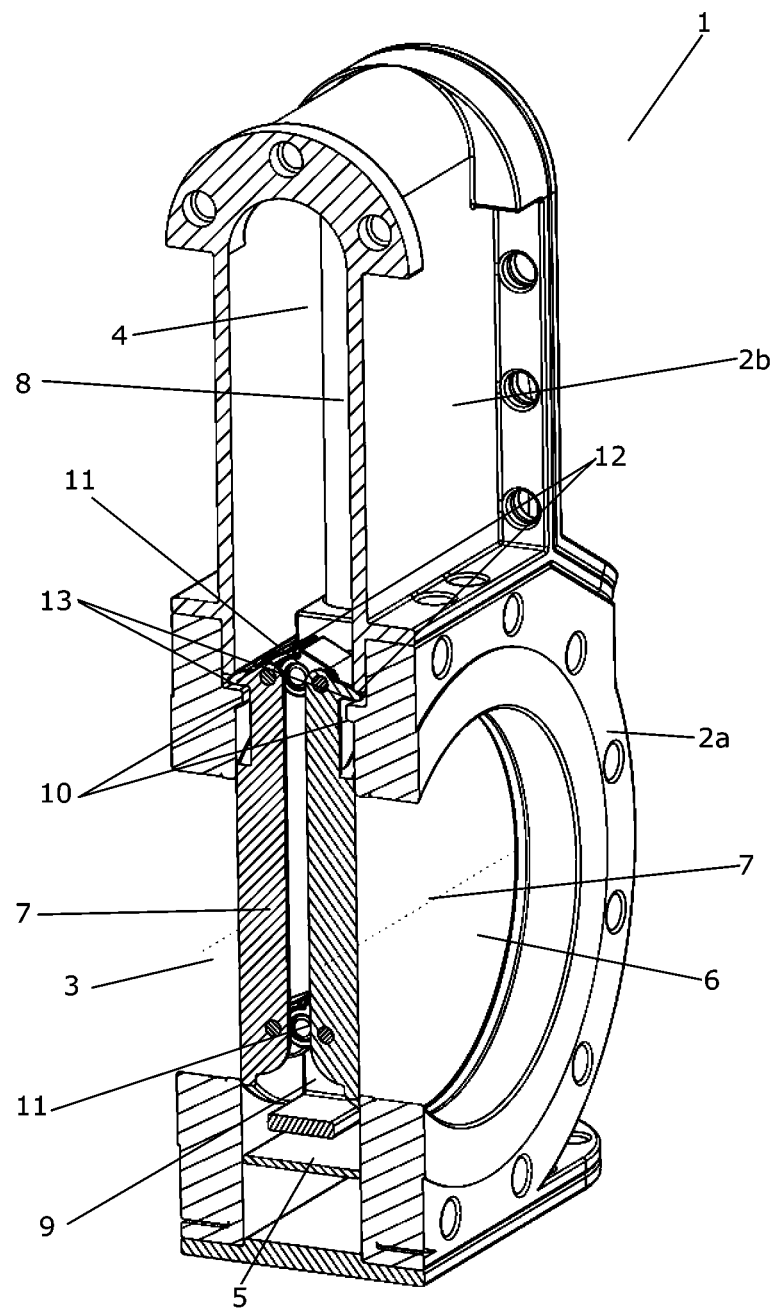

In FIG. 10 the lower part 9 of the moving mechanism 4 has been moved slightly in an upwards direction relative to the upper part 8 of the moving mechanism 4, as compared to the position shown in FIG. 9. Thus the protruding parts 12 are no longer arranged in abutment with the wall parts 13. Instead the protruding parts 12 are arranged immediately adjacent to lower edges of the side walls of the upper valve housing 2*b*. The valve elements 7 are still arranged in abutment with the valve seats, i.e. the valve system 1 is still in a completely closed state, even though the opening process has been commenced. Moving the lower part 9 of the moving mechanism 4 further upwards will cause the protruding parts 12 to slide along the lower edges of the side walls of the upper valve housing 2*b*. This will cause the valve members 7 to be moved away from the fluid inlet 3 and the fluid outlet 6, respectively, and towards the moving mechanism 4 by means of the moving arms 11. Thereby the valve system 1 is opened, i.e. fluid medium is allowed to flow through the valve system 1.

The curved upper surfaces of the protruding parts 12 ensure that the opening of the valve system 1 is performed in a controlled and precise manner.

Figure 11:
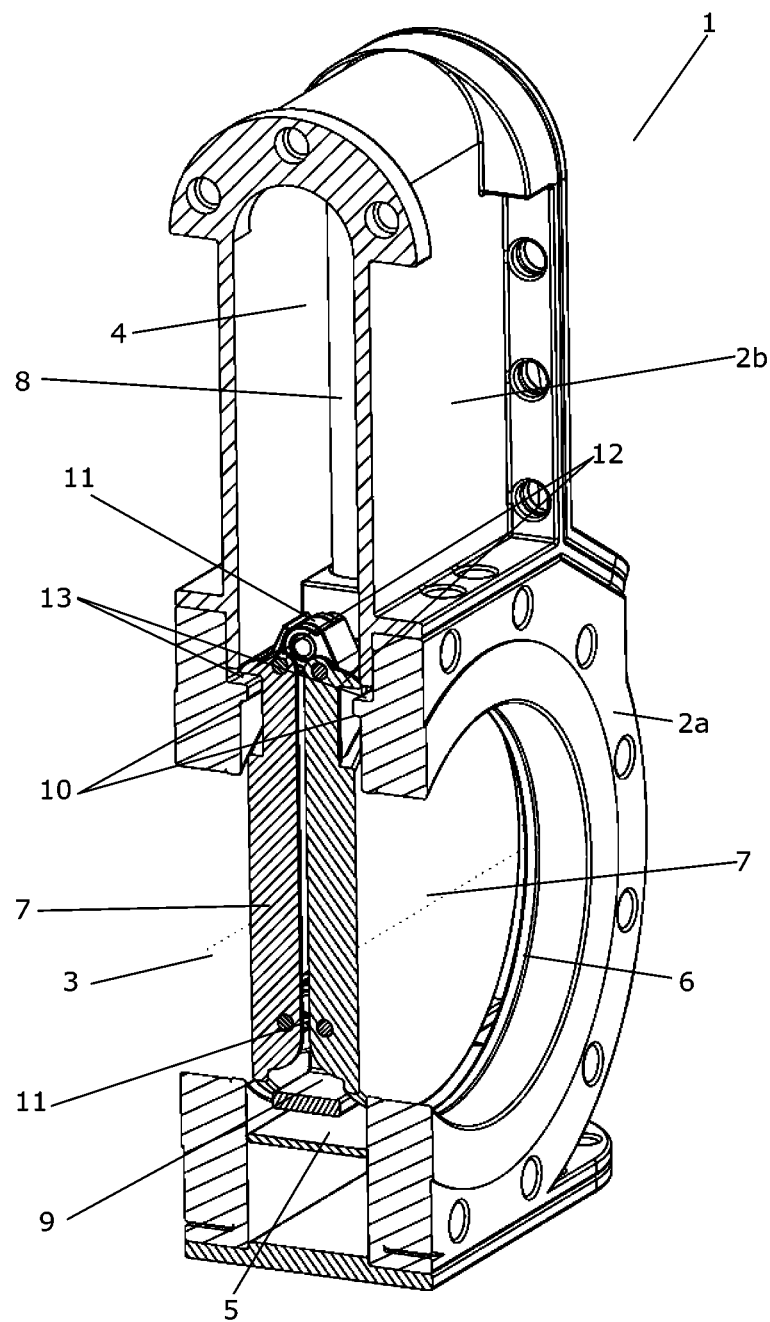

In FIG. 11 the lower part 9 of the moving mechanism 4 has been moved slightly in an upwards direction as compared to the situation illustrated in FIG. 10. Thus, in FIG. 11 the valve elements 7 have been moved away from the fluid inlet 3 and the fluid outlet 6, respectively, as described above, and the valve system 1 is therefore in an open state, with a low opening degree.

Figure 12:
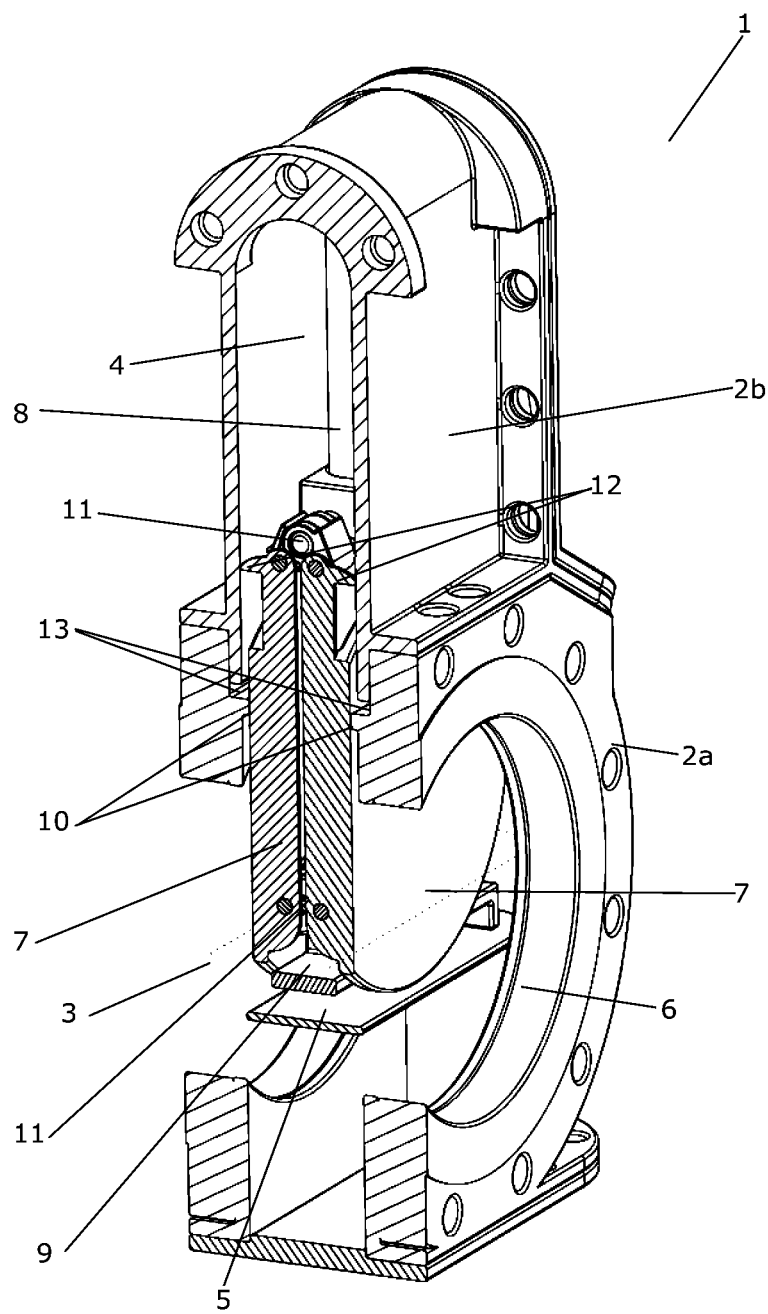

In FIG. 12 the lower part 9 of the moving mechanism 4 has been moved even further in an upwards direction. This has caused the valve elements 7 to be moved towards the upper valve housing 2*b*, and the opening degree of the valve system 1 has thereby been increased, but the maximum opening degree has not yet been reached.

It can be seen that the protruding parts 12 abut against the side walls of the upper valve housing 2*b*, thereby keeping the valve elements 7 in a position close to the lower part 9 of the moving mechanism 4 as described above with reference to FIG. 8.

Figure 13:
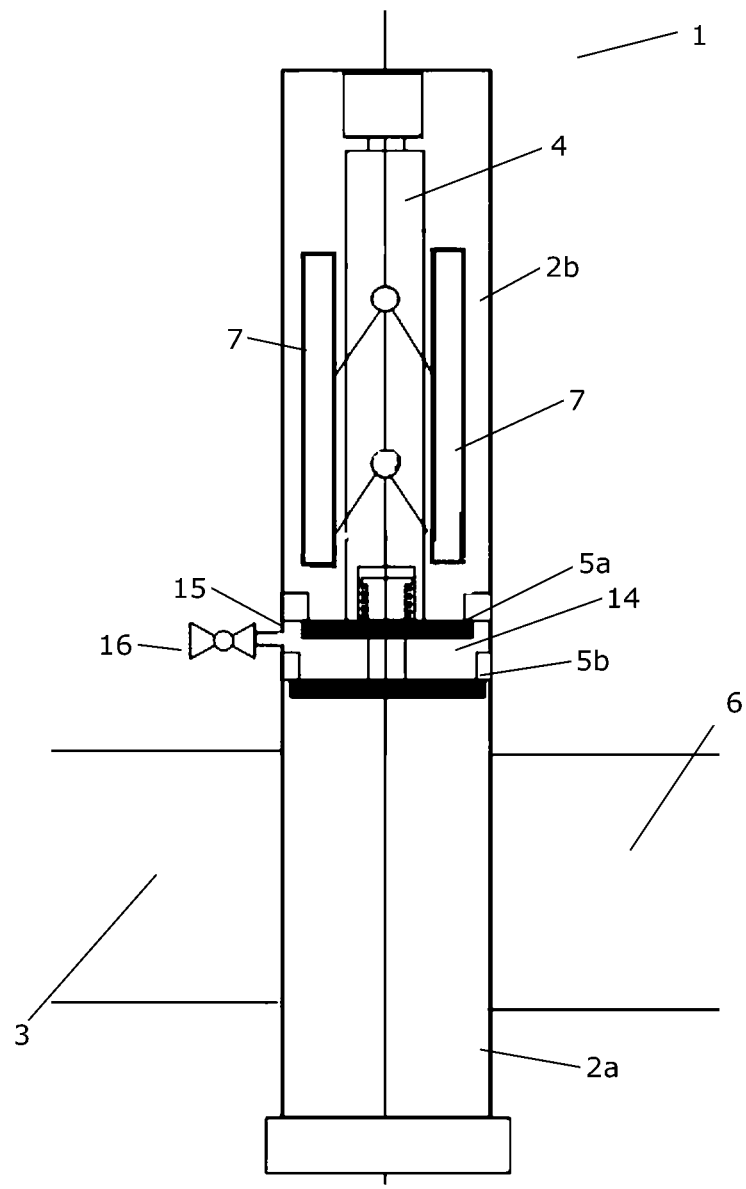
FIG. 13 is a cross section view of an embodiment of a valve system with a bleeder valve.

FIG. 13 is a cross sectional view of a valve system 1 according to an embodiment of the invention where the valve system comprises a bleeder valve. The valve system 1 comprises a valve housing 2 defining a first part, in the form of a lower valve housing 2*a*, and a second part, in the form of an upper valve housing 2*b*. The lower valve housing 2*a* is provided with a fluid inlet 3 and a fluid outlet 6. The valve system 1 is disclosed in an open state, fluid medium is allowed to flow through the valve system 1 from the fluid inlet 3 to the fluid outlet 6 via the lower valve housing 2*a*. The valve elements 7 are arranged in the interior part of the upper valve housing 2*b*. The moving mechanism 4 is positioned in such a manner that the sealing member 5 is arranged in the second extreme position, thereby separating the lower valve housing 2*a* from the upper valve housing 2*b* in a sealing manner. The sealing member 5 comprising two plate members, a first plate member 5*a* and a second plate member 5*b* the two plate members forming a double wall part, and thereby a double sealing of the first part of the interior of the valve housing 2 when the sealing member 5 is in a separating position. The two plate members 5*a*, 5*b* forming together with the valve housing an intermediate room 14 in the interior of the valve housing 2 when the sealing member 5 is in a separating position. An opening 15 is placed in the valve housing and forming an opening in the intermediate room 14, a valve member 16 is placed in connection with the opening 15 for bleeding of the valve system.

Although various embodiments of the present invention have been described and shown, the invention is not restricted thereto, but may also be embodied in other ways within the scope of the subject-matter defined in the following claims.

What is claimed is:

1. A double disk valve system comprising:
   a valve housing defining a fluid inlet for receiving a fluid medium, and a fluid outlet for delivering the fluid medium,
   at least two valve elements arranged in an interior part of the valve housing, the valve elements being movable relative to the valve housing, the position of the valve elements relative to the valve housing determining a flow rate of fluid medium through the valve system from the fluid inlet towards the fluid outlet,
   a moving mechanism arranged to cause movements of the valve elements, and
   a sealing member arranged in an interior part of the valve housing, the sealing member being capable of separating the interior of the valve housing into a first part comprising the fluid inlet and the fluid outlet, and a second part,
   wherein the sealing member is mounted on the moving mechanism, the sealing member thereby being movable along with the valve elements, wherein the sealing member is a plate member, the plate member forming a wall part of the first part of the interior of the valve housing when the sealing member is in a separating position in which the interior of the valve housing is separated into the first part and the second part, and wherein the valve elements are arranged in the second part of the interior of the valve housing when the sealing member is in a separating position in which the interior of the valve housing is separated into the first part and the second part.

2. The valve system according to claim 1, wherein the at least two valve elements, being movable by means of the moving mechanism in a substantially synchronous manner.

3. The valve system according to claim 2, wherein each valve element is in the form of a disk, each disk being movable into sealing contact with a valve seat, thereby preventing a fluid flow through the valve system from the fluid inlet towards the fluid outlet.

4. The valve system according to claim 1, wherein each valve element is in the form of a disk, each disk being movable into sealing contact with a valve seat, thereby preventing a fluid flow through the valve system from the fluid inlet towards the fluid outlet.

5. The valve system according to claim 1, wherein the sealing member has an outer shape which matches an interior cross section of the valve housing.

6. The valve system according to claim 1, wherein the sealing member comprises a rim portion adapted to form a sealing contact with a wall part of the valve housing.

7. The valve system according to claim 1, wherein the sealing member is automatically moved to a separating position in which the interior of the valve housing is separated into the first part and the second part, when the moving mechanism moves the valve elements towards a position allowing an increased fluid flow through the valve system from the fluid inlet towards the fluid outlet.

8. The valve system according to claim 1, wherein the sealing member is or comprises two plate members, a first plate member and a second plate member, forming a double wall parts of the first part of the interior of the valve housing when the sealing member is in the separating position.

9. The valve system according to claim 8, wherein the two plate members, forming an intermediate room in the interior of the valve housing when the sealing member is in the separating position, and an opening is placed in the valve housing and forming an opening in the intermediate room, a valve member is placed in connection with the opening for bleeding of the valve system.

10. The valve system according to claim 1, wherein the moving mechanism comprises a spindle and a nut adapted to cause a substantially linear movement of the valve elements and the sealing member.

11. The valve system according to claim 1, wherein the moving mechanism comprises one or more articulated links interconnecting each of the valve elements to the moving mechanism, thereby allowing movement of each valve element towards and away from the moving mechanism.

12. The valve system according to claim 1, wherein the moving mechanism is arranged to cause movements of the valve elements along a first direction, and along a second direction being substantially transverse to the first direction.

13. The valve system according to claim 1, wherein the valve housing provides access to the second part of the interior of the valve housing.

14. The valve system according to claim 1, further comprising a locking mechanism adapted to lock the valve elements in a position defining a minimal flow rate of fluid medium through the valve system.

15. A fluid flow system comprising a valve system according to claim 1.

16. The fluid flow system according to claim 15, wherein the fluid flow system is or forms part of an offshore installation.

* * * * *